(12) United States Patent
Lee et al.

(10) Patent No.: US 8,349,440 B2
(45) Date of Patent: Jan. 8, 2013

(54) HIGH BARRIER MULTILAYER FILM FOR FUNCTIONAL MEDICAL SOLUTION PRODUCT

(75) Inventors: Sung-Man Lee, Yongin-si (KR); Jin-Sung Moon, Pyeongtaek-si (KR)

(73) Assignee: Choongwae Corporation (KR)

( * ) Notice: Subject to any disclaimer, the term of this patent is extended or adjusted under 35 U.S.C. 154(b) by 30 days.

(21) Appl. No.: 12/810,234

(22) PCT Filed: Dec. 19, 2008

(86) PCT No.: PCT/KR2008/007541
§ 371 (c)(1), (2), (4) Date: Jun. 23, 2010

(87) PCT Pub. No.: WO2009/082133
PCT Pub. Date: Jul. 2, 2009

(65) Prior Publication Data
US 2010/0266825 A1 Oct. 21, 2010

(30) Foreign Application Priority Data
Dec. 24, 2007 (KR) .................. 10-2007-0136021

(51) Int. Cl.
| | |
|---|---|
| *B32B 27/30* | (2006.01) |
| *B32B 27/34* | (2006.01) |
| *B32B 27/40* | (2006.01) |
| *B32B 27/28* | (2006.01) |
| *B32B 7/02* | (2006.01) |
| *B32B 27/08* | (2006.01) |

(52) U.S. Cl. ..... 428/214; 428/35.2; 428/35.7; 428/35.9; 428/212; 428/474.4; 428/688; 428/36.7; 428/36.9

(58) Field of Classification Search .................. None
See application file for complete search history.

(56) References Cited

U.S. PATENT DOCUMENTS

| | | | | |
|---|---|---|---|---|
| 4,741,936 | A | * | 5/1988 | Nohara et al. .............. 428/36.7 |
| 5,589,252 | A | * | 12/1996 | Matsuo et al. .............. 428/216 |
| 6,027,776 | A | | 2/2000 | Mueller |
| 2004/0013862 | A1 | * | 1/2004 | Brebion et al. .............. 428/212 |

(Continued)

FOREIGN PATENT DOCUMENTS

JP 05-0151574 * 3/1993

(Continued)

OTHER PUBLICATIONS

International Search Report—PCT/KR2008/007541 dated Jul. 16, 2009.

(Continued)

*Primary Examiner* — David Sample
*Assistant Examiner* — Nicole T Gugliotta
(74) *Attorney, Agent, or Firm* — Cantor Colburn LLP

(57) ABSTRACT

The present invention relates to a high barrier multilayer film for functional medical solution product comprising in order, an outer layer comprising polyethyleneterephthalate deposited inorganic oxide thereon; a first adhesive layer comprising ester type polyurethane; a first intermediate layer comprising ethylene vinyl alcohol copolymer; a second adhesive layer comprising ester type polyurethane; a second intermediate layer comprising polyamide; a third adhesive layer comprising ester type polyurethane; and an inner layer comprising propylene-based polymer. The multilayer film has the merits of improved transparency, heat resistance, sealing property, durability, competitive price, oxygen barrier property and less pinhole, so that may be applied to a outer bag of pouch type container of medical solution.

15 Claims, 4 Drawing Sheets

U.S. PATENT DOCUMENTS

| | | | |
|---|---|---|---|
| 2004/0076778 A1* | 4/2004 | Mori et al. | 428/35.2 |
| 2006/0233985 A1* | 10/2006 | Pockat et al. | 428/34.9 |
| 2009/0104392 A1* | 4/2009 | Takada et al. | 428/36.6 |
| 2010/0151265 A1* | 6/2010 | Okuzu et al. | 428/522 |

FOREIGN PATENT DOCUMENTS

| | | |
|---|---|---|
| JP | 08-275985 | 10/1996 |
| JP | 09262948 | 10/1997 |
| JP | 2000-263722 | 9/2000 |
| JP | 2004050605 | 2/2004 |
| JP | 2004231199 | 8/2004 |
| JP | 2007075368 | 3/2007 |
| JP | 2007230637 | 9/2007 |
| KR | 10-2003-0046120 | 6/2003 |
| KR | 10-0651346 | 11/2006 |
| WO | 02/085111 | 10/2002 |
| WO | 2005/014283 | 2/2005 |
| WO | 2007/026554 | 3/2007 |
| WO | WO 2007/034940 A1 * | 3/2007 |

OTHER PUBLICATIONS

Written Opinion—PCT/KR2008/007541 dated Jul. 16, 2009.
Japanese Office Action—Japanese Application No. 2010-539305 issued on Feb. 22, 2012, citing JP Pub. 2004-50605, JP Pub. 2007-230637, JP Pub. 2007-75368, JP Pub. 09-262948 and JP Pub. 2004-231199.
Korean Office Action—Korean Application No. 10-2008-0129910 issued on Feb. 10, 2011.

* cited by examiner

10

10

HIGH BARRIER MULTILAYER FILM FOR FUNCTIONAL MEDICAL SOLUTION PRODUCT

TECHNICAL FIELD

The present invention relates to a high barrier multilayer film for functional medical solution product having improved transparency, heat resistance, sealing property, durability, competitive price, as well as high oxygen barrier property and less pinhole, so that may be applied to a outer bag of pouch type container of medical solutions.

BACKGROUND ART

Generally, a medical solution container must meet a number of performance criteria, including flexibility, transparency, gas barrier property, drug compatibility, heat sterilization resistance, fall impact resistance, etc.

As the medical solution container, it is common used a flexible plastic bag with multiple chambers (two and more) divided by partition walls. The medical solution container uses partition wall for various medical solutions kept in each chambers not to react with other medical solution kept in other chambers. And when the medical solution is in need to inject to a patient, the medical solution is mixed by pushing the chambers for various medical solutions to be mixed. The mixed functional medical solutions are administered to a patent via spike port using a syringe with sanitary and safe.

In case of administering medical solutions by connecting a few or many medical solution bags or bottles, medical staff may mistake in injecting medical solution, but using the afore-mentioned medical solutions having chambers divided by partition walls reduce the mistake by medical staff and gives various merits in keeping and handling.

Various types of medical solution container are now available, for example, a double bag with an inner bag and outer bag, where the inner bag contains functional medical solutions and the outer bag covers the inner bag and has gas or oxygen blockage function.

In this way, medical solution container having multiple chambers or single inner bag wrapped by outer bag have been studied from 10 years ago in Europe, and recently investigation for building up properties, i.e. fall impact resistance as well as gas or moisture barrier function are accelerated.

In general, the inner bag needs to have various properties such as oxygen and moisture barrier property, heat sterilization resistance, transparency, fall impact resistance, flexibility, etc, and the outer bag also needs to have various properties such as oxygen and moisture barrier property, heat sterilization resistance, and transparency, etc rather than fall impact resistance and flexibility.

In especial, the container for medical solutions, i.e. functional medical solutions, should have superior gas barrier property, fall impact resistance and transparency in comparison with that of a conventional medical solution container. Preferably, the film with high transparency for an outer bag is necessary in order to check impurities in functional medical solutions. In addition to this, it is required to new film manufacturing technology for guarantee transparency after sterilization of 121° C. Also, the outer bag must have high oxygen barrier property, because various medical solutions to be able to react with oxygen are wrapped in the inner bag.

The product of Pactive. Ltd in Germany, one of the best outer bags, is a multilayer (5 layers) co-extruded film laminated a PP outer layer/polyolefin adhesive layer/EVOH oxygen barrier intermediate layer/polyolefin adhesive layer/PP heat seal layer. Because the product of Pactiv exhibits extremely poor hazes, namely, the haze after sterilization (121° C., 30 minutes) over 50%, it is required to improve transparency for checking impurities in a bag.

To improve transparency, various types of the multilayer film were proposed for example, inorganic oxides deposited on PET, nylon, polyolefin for use in the fields of foods and medical industries.

Japanese Patent laid-open 2000-263722 suggests a multilayer film having improved barrier property to oxygen and moisture by laminating PET film on PP base film and depositing metal oxide like silica or alumina on the PET film.

PCT publication WO 2007/026554 describes a method of making a barrier film deposited silicon oxide thereon at least one surface of inner or outer surface by plasma CVD with gaseous organic silica compound and oxygen gas.

The above-mentioned material of the multilayer film exhibits poor flexibility, but high barrier property. However, the multilayer film itself has a disadvantage of lessening oxygen barrier property by cracking a deposited inorganic layer caused by repeated folding and unfolding of bag during handling or before and after sterilization.

In especial, the medical solution container bag must have high oxygen barrier property, because injected amino acid solution, glucose solution, and electrolytes degenerate easily by oxygen. The polyolefin inner bag as a medical solution container has low oxygen barrier property, so that extra outer packing or new composition for enhancing oxygen barrier property of the inner bag is necessary.

PCT publication WO 2002/85111 discloses a container having a multilayer laminated structure of a contacting layer/an oxygen and moisture barrier layer/an outer layer, and wherein EVOH was engaged as the oxygen and moisture barrier layer.

PCT publication WO 2005/014283 describes a method of enhancing oxygen barrier property by film structure of LDPE film/a functional barrier layer selected from the group consisting of polyamide, EVOH, PET, blends thereof and aluminum foil/a heat-adhesion layer having inorganic fillers and polyolefin.

However, EVOH has extremely poor haze after sterilization, especially getting worse at the condition of high temperature and moisture, resulting decrease of oxygen barrier property.

Therefore film having superior transparency despite high temperature treatment and oxygen barrier property is necessary, and the present invention proposes the multilayer film having satisfactory transparency and oxygen barrier property that can overcome the above-mentioned various problems.

DISCLOSURE

Technical Problem

To solve the problems, one object of the present invention is to provide a high barrier multilayer film for a medical solution product having improved transparency, heat resistance, durability, good oxygen barrier property as well as less pinhole.

Technical Solution

To accomplish this goal, the present invention provides a high barrier multilayer film for functional medical solution product comprising in order, an outer layer comprising polyethyleneterephthalate deposited inorganic oxide thereon;

a first adhesive layer comprising ester type polyurethane;

a first intermediate layer comprising ethylene vinyl alcohol copolymer;

a second adhesive layer comprising ester type polyurethane;

a second intermediate layer comprising polyamide;

a third adhesive layer comprising ester type polyurethane; and an inner layer comprising propylene-based polymer.

In addition, the multilayer film further comprises a protective layer between the outer layer and first adhesive layer.

Advantageous Effect

The high barrier multilayer film for functional medical solution product of the present invention has improved transparency, heat resistance, sealing property, durability and competitive price as well as less pinhole, so that can be used as an outer bag of a pouch type container for containing medical solutions and blood in medical industry.

BEST MODE

The present invention now will be described more fully hereinafter with reference to the accompanying drawings, in which some, but not all embodiments of the invention are shown.

It is to be understood, however, that the invention is not limited to the specific features shown and described, since the means herein disclosed comprise preferred forms of putting the invention into effect. Like numbers refer to like elements throughout. Moreover, when a layer is on other layer, it may be contact therewith or added another layer between them. For example, it may be inserted a certain layer including an adhesive layer, a barrier layer to moisture or gas, and so on into a multilayer film.

Figure 1:
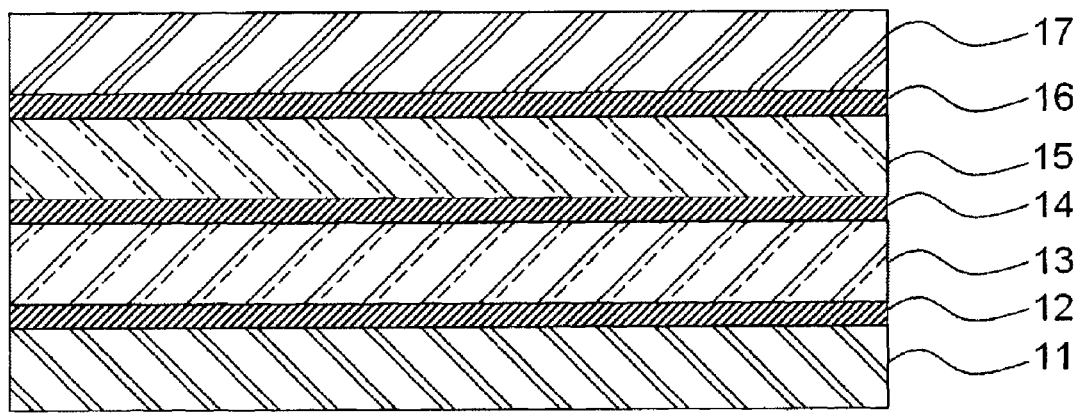
FIG. 1 is a cross-sectional view of the multilayer film in accordance with one embodiment of the present invention.

FIG. 1 is a cross-sectional view of the multilayer film in accordance with one embodiment of the present invention.

Referring to FIG. 1, the multilayer film has the laminated structure of an outer layer (11), a first intermediate layer (13), a second intermediate layer (15) and an inner layer (17) in order, and the first adhesive layer (12), the second adhesive layer (14) and the third adhesive layer (16) are inserted into between the layers, orderly.

The outer layer (11) is the most-exterior layer, and acts as an oxygen and moisture barrier layer. This outer layer (11) comprises polyethyleneterephthalate (PET) deposited inorganic oxide on its surface.

Preferably the outer layer (11) includes PET, which is used wildly as a packaging material due to the merits of flexibility, barrier property, high mechanical strength and dimensional stability, heat resistance, chemical resistance, transparency, stiffness, and broad operating temperature. The biaxial stretched PET film is preferable in terms of improving property, more preferably has a thickness of 5~20 μm.

The inorganic oxide is engaged to enhance the oxygen and gas barrier property, and preferably uses silicon oxide. The silicon oxide (SiOx) is the combination of brown solid sate SiO and colorless solid state ($SiO_2$) and is deposited on PET film by conventional deposition method. The oxygen and gas barrier function by the silicon oxide depends on the oxygen quantity in the silicon oxide. In words, if the oxygen quantity in silicon oxide is high, the oxygen and gas barrier function of the silicon oxide is poor; therefore oxygen quantity in SiO steam may be preferably controlled within the range of 1.5~1.8 during deposition process. The barrier property of $SiO_{1.5}$ is better than that of $SiO_{1.8}$, but if the oxygen quantity in SiO is under 1.5, the color of PET film inclines to brown.

In a preferred embodiment of the present invention, the outer layer (11) has an oxygen-permeability (JIS K 7126, 25° C., 80% RH) of 1 cc/$m^2$·d·atm or less, a moisture-permeability (JIS K 7129, 40° C., 90% RH) of 1 g/$m^2$·d or less, a haze (JIS K 7136) of 5% or less, a tensile strength (JIS K 7127) of 200~250 MPa and a tensile elongation (JIS K 7127) of 100~120%.

Preferably, thickness of the inorganic oxide layer ranges from 40 to 200 nm. If the thickness is under 40 nm, the gas barrier property decreases owing to non-uniform deposition, and if the thickness is over 200 nm, the durability decreases owing to possibility of cracking.

The dry deposition method is preferable among conventional deposition method, and the deposition method is not limited thereto. Specifically, the dry deposition method is as follows: chemical vapor deposition (CVD), Low Pressure chemical vapor deposition (LPCVD), Plasma Enhanced chemical vapor deposition (PECVD), Atmospheric Pressure chemical vapor deposition (APCVD), physical vapor deposition (PVD), evaporation, sputtering and Atomic Layer Deposition (ALD). CVD is more preferable.

The outer layer (11) lacks in flexibility and oxygen barrier property resulting by breaking of the deposited inorganic oxide by repeated folding and unfolding process during handling of the bags before and after sterilization notwithstanding good barrier property. Therefore it is preferable that oxygen and gas barrier layer and strength enhancing layer is engaged as an intermediate layer.

The first intermediate layer of the present invention comprises ethylene vinyl alcohol copolymer (EVOH).

EVOH is a copolymer of ethylene and vinyl acetate, and has the merits of superior transparency, chemical resistance, retention of fragrance, weather resistance, and excellent oxygen and gas barrier property. Therefore the EVOH preserves the oxygen and gas barrier property in case of cracking of the medical solution (for example, I.V. solution) container.

The second intermediate layer (15) of the present invention comprises polyamide to enhance the strength and increase the heat resistance of the multilayer film. The polyamide is commercially known as 'Nylon' comprising acid amide (—CONH—) bond, and has merits of high strength and elasticity. The second intermediate layer (15) includes, but are not limited to, any conventional polyamide such as polyamide6, polyamide66, polyamide610, polyamide11, polyamide12, polyamide46, polyamide MXD6 (polymer of meta-xylendiamine and adipic acid) and a mixture thereof.

The second intermediate layer (15) may be a single layer film or multilayer film, and multilayer of polyamide 6/polyamide MXD6/polyamide 6 is preferable. The multilayer film of the intermediate layer may be fabricated by co-extrusion of polyamide resin and additional co-stretching process.

Preferable thickness of the first intermediate layer (13) and the second intermediate layer (15) is 10~25 μm and 10~40 μm respectively to maximize the effect of inserting intermediate layers, and more preferable second intermediate layer (15) is biaxial elongated layer. At this point, preferable thickness of the multilayer type of the second intermediate layer is 10~40 μm, and preferable thickness of the single layer type of the second intermediate layer is 10~25 μm.

In a preferred embodiment of the present invention, the first intermediate layer (13) has an oxygen-permeability (ISO 14663-2, 25° C., 85% RH) of 10 cc/m$^2$·d·atm or less, a moisture-permeability (JIS Z 0208, 40° C., 90% RH) of 150 g/m$^2$·d or less, a haze (JIS K 7105) of 3% or less, a tensile strength (ISO 1184) of 60~120 MPa and a tensile elongation (ISO 1184) of 100~200%.

In a preferred embodiment of the present invention, the second intermediate layer (15) has a haze (ASTM 1003, 23° C., 50% RH) of 3% or less, a tensile strength (ASTM D 882) of 15~20 kg/mm$^2$ and a tensile elongation (ASTM D 882) of 120~160%. When the second intermediate layer (15) is a trilayer of polyamide, its oxygen-permeability (ISO 14663-2, 25° C., 85% RH) is 10 cc/m$^2$·d·atm or less.

Also, by treating corona discharge to one or both sides of the first and second intermediate layers (13, 15), if needs, enhances adhesion with adjacent adhesive layers.

The inner layer (17) of the present invention comprises propylene-based polymer.

The inner layer (17) makes the multilayer film have heat seal and includes one material selected form the group consisting of polypropylene, polypropylene copolymer and a mixture thereof.

Preferably, the polypropylene copolymer is a copolymer of propylene and one co-monomer selected from the group consisting of ethylene, α-olefin, and a mixture thereof. The preferable α-olefin, but are not limited to, may be 1-butene, 1-pentene, 1-hexene, 4-methyl-1-pentene, 1-heptene, 1-octene, 1-nonene, 1-decene, 1-undecene, 1-dodecene or a mixture thereof.

The preferable thickness of the inner layer (17) is 40~120 μm for having good heat seal. If the thickness is under 40 μm, the physical strength of the overall film decreases owing to low thickness. Otherwise, if the thickness is over 120 μm, the flexibility of the film decreases.

It is preferable that the inner layer (17) is a non-elongated film in viewpoint of retention of physical property.

In a preferred embodiment of the present invention, the inner layer (17) has a haze (ASTM 1003) of 25% or less, a tensile strength (ASTM D 882) of 2~8 kg/mm$^2$ and a tensile elongation (ASTM D 882) of 550~650%.

The multilayer film (10) of the present invention further comprises the first adhesive layer (12), the second adhesive layer (14) and the third adhesive layer (16) between layers such as the outer layer (11), the first intermediate layer (13), the second intermediate layer (15) and the inner layer (17) to enhance adhesion. Preferably, the first, second and third adhesion layers (12, 14, 16) comprises ester type polyurethane.

The ester type polyurethane is prepared by polymerization ester polyol with isocyanate compound, and has properties such as high adhesion property, good tensile strength, chemical resistance and abrasion resistance. The ester type polyurethane may be one component type or two components type, and the two components ester type polyurethane is more preferably applicable to lamination method.

In case of laminating the adhesion layer, the coating content of ester type polyurethane is at a weight ranging from 1 to 10 g/m$^2$ (at dried state). The choice of ester type polyurethane is selected and controlled by the skilled person in this art on the basis of the preparation method.

The preferable thickness of the first, second and third adhesive layers (12, 14, 16) is 1~10 μm.

Figure 2:
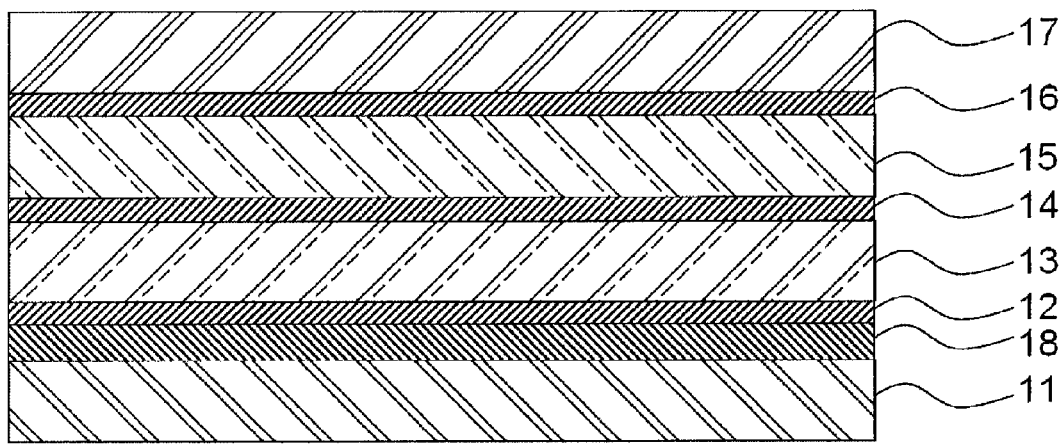
FIG. 2 is a cross-sectional view of the medical solution container in accordance with another embodiment of the present invention.

FIG. 2 is a cross-sectional view of the medical solution container in accordance with another embodiment of the present invention.

Referring to FIG. 2, the multilayer film (10) comprises an outer layer (11); a protective layer (18); a first adhesive layer (12); a first intermediate layer (13); a second adhesive layer (14); a second intermediate layer (15); a third adhesive layer (16); and an inner layer (17), orderly.

The detailed explanation of the layers such as the outer layer (11); the first adhesive layer (12); the first intermediate layer (13); the second adhesive layer (14); the second intermediate layer (15); the third adhesive layer (16); and the inner layer (17) is followed the above-mentioned.

Especially, the protective layer (18) is located between the outer layer (11) and the first adhesive layer (12), and acts as a barrier capable of blocking oxygen and gas permeation. That is, the protective layer (18) prevent decrease of oxygen barrier property by crack or pin-hole induced from breaking of the deposited inorganic oxide layer during repeated folding and unfolding process, handling of the bags before, after sterilization, etc. By inserting the protective layer (18), the multilayer film of the present invention, therefore, can maintain proper oxygen and gas barrier property in case of damage of the outer layer (11), and has enhanced adhesion between the outer layer (11) and the first adhesive layer (12).

The preferable thickness of the protective layer (18) is 0.01~10 μm.

The material of the protective layer (18) may comprise metal alkoxide or hydrolysate thereof.

The metal alkoxide is represented as M(OR)n, wherein M is Si, Ti, Al, Zr or Sn, and R is C1~C6 alkyl, and n is atomic value of M. In a preferred embodiment of the present invention, the metal alkoxide includes tetraethoxy silane, triisopropylaluminum or tetrabutoxyzirconium, which form stable hydrolysate in aqueous solution.

Additionally, the protective layer (18) may further comprise isocyanate compound.

Preferably, the isocyanate compound may be selected from the group consisting of tolylene diisocyanate, triphenylmethane triisocyanate, isophorone diisocyanate, tetramethylxylene diisocyanate and a mixture thereof.

In another embodiment, the protective layer (18) of the present invention may further comprise tin chloride, which is selected from the group consisting of stannous chloride, stannic chloride and a mixture thereof. The protective layer (18) may be a single layer or a multilayer comprising at least the above-mentioned material by the skilled person in this art. Such the protective layer (18) may be prepared by wet coating, co-extrusion or lamination method explained below.

The preparation method of the present multilayer film may be conventional method and not limited to the method described in detail herein below.

Representatively, the multilayer of the present invention can be formed by co-extrusion method or lamination method The co-extrusion process is executed as following: melting more than two resin materials at different extruders, injecting the melted resins into a die, laminating as layers, and cooling the layers using various methods. The co-extrusion method gives the advantage of fabricating uniform thickness of extrusion material with efficiency. Also, it is so low the quality deterioration of resin material during extrusion that each layer shows proper properties and the obtained multilayer has high transparency and flexibility. There are two co-extrusion processes: one is inflation method using circular die, and the other is T-die method using flat die. The inflation method is preferred in view point of clearness, and T-die method is better in view point of uniform thickness of each layer.

In a preferred embodiment of the present invention, the multilayer film is fabricated at the temperature of 170~250° C., more preferably at the temperature of 200~230° C. by the co-extrusion process. It is preferable that melt flow rate (MFR) difference between resins for each layer is little to give uniform thickness of each layer and good extrusion performance.

The lamination method has the merits of retention of uniform thickness and high transparency, which may be, but are not limited to, wet lamination, dry lamination, solvent-free lamination, wax lamination, thermal lamination, extrusion coating lamination, etc.

Among these lamination methods, dry lamination or solvent-free lamination is preferable for use a container of medical solutions.

In a preferred embodiment of the present invention, the multilayer for use in container of medical solutions has proper properties, i.e. haze, tensile strength, tensile modulus and oxygen permeability, as well as the above-described properties. Preferably, the multilayer film has a haze (ASTM D 1003) of 10% or less, a tensile strength (ASTM 882) of 700 kgf/cm$^2$ or more and an oxygen permeability of 5.0 cc·m$^2$·day·atm or less.

The multilayer film of the present invention has good transparency, heat resistance, sealing property, durability, oxygen and gas barrier property and competitive price that can be applicable to outer bag of two-bag type medical solution container, for example amino acid mono bag and multi chamber bag.

Figure 3:
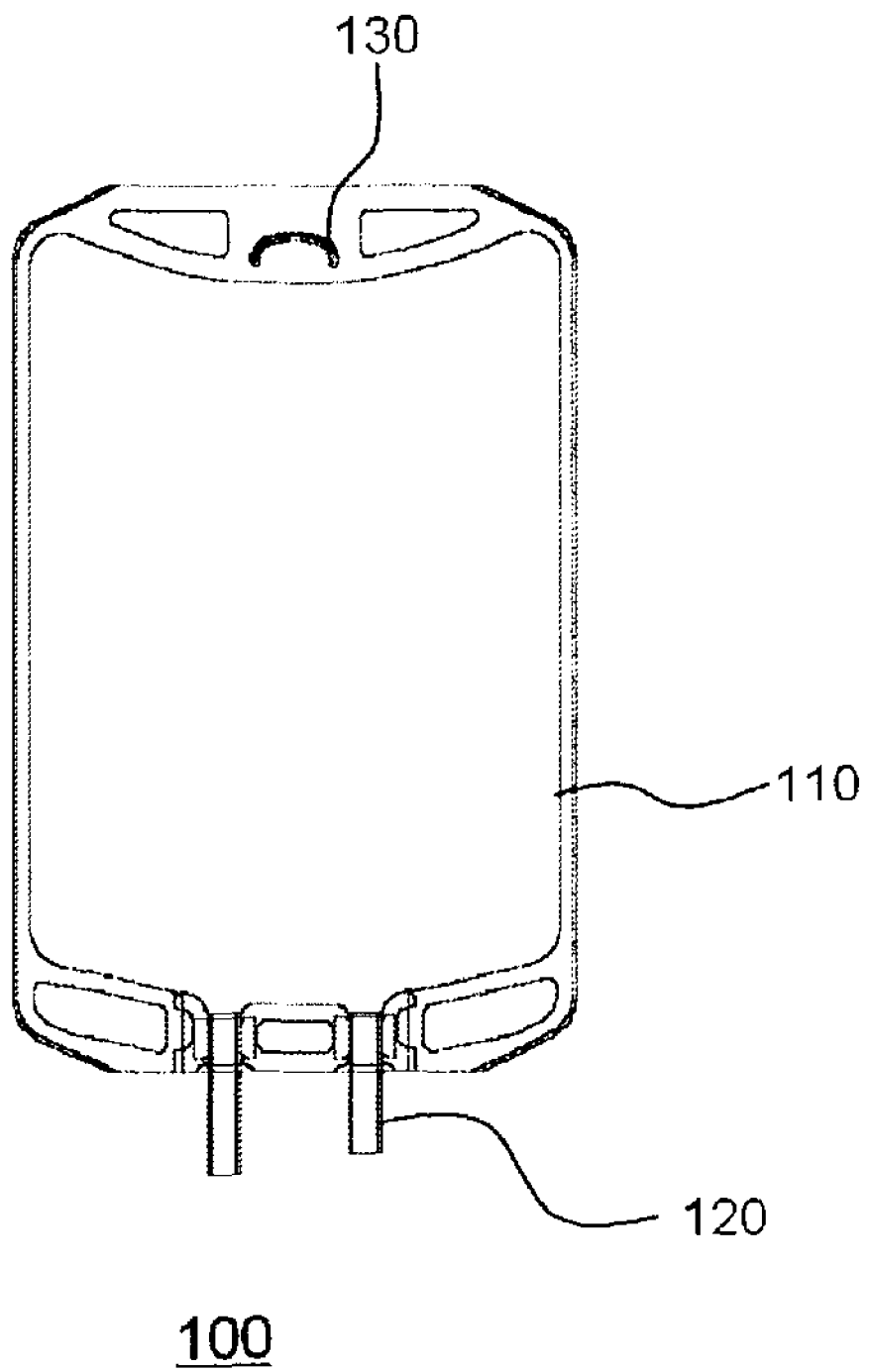
FIG. 3 is a schematic view of the medical solution container in accordance with one embodiment of the present invention.

FIG. 3 is a schematic view of the medical solution container (mono-bag) in accordance with one embodiment of the present invention.

Referring to FIG. 3, the medical solution container (100) comprises the inner bag (110) having one chamber; an outlet (120) for discharging medical solutions; and a hanger (130) for hanging the container (100).

The medical solution container (100) is used in providing nutrient solutions to patient, and the multilayer film of the present invention is preferably applicable to outer bag of mono bag with nutrient solutions.

Figure 4:
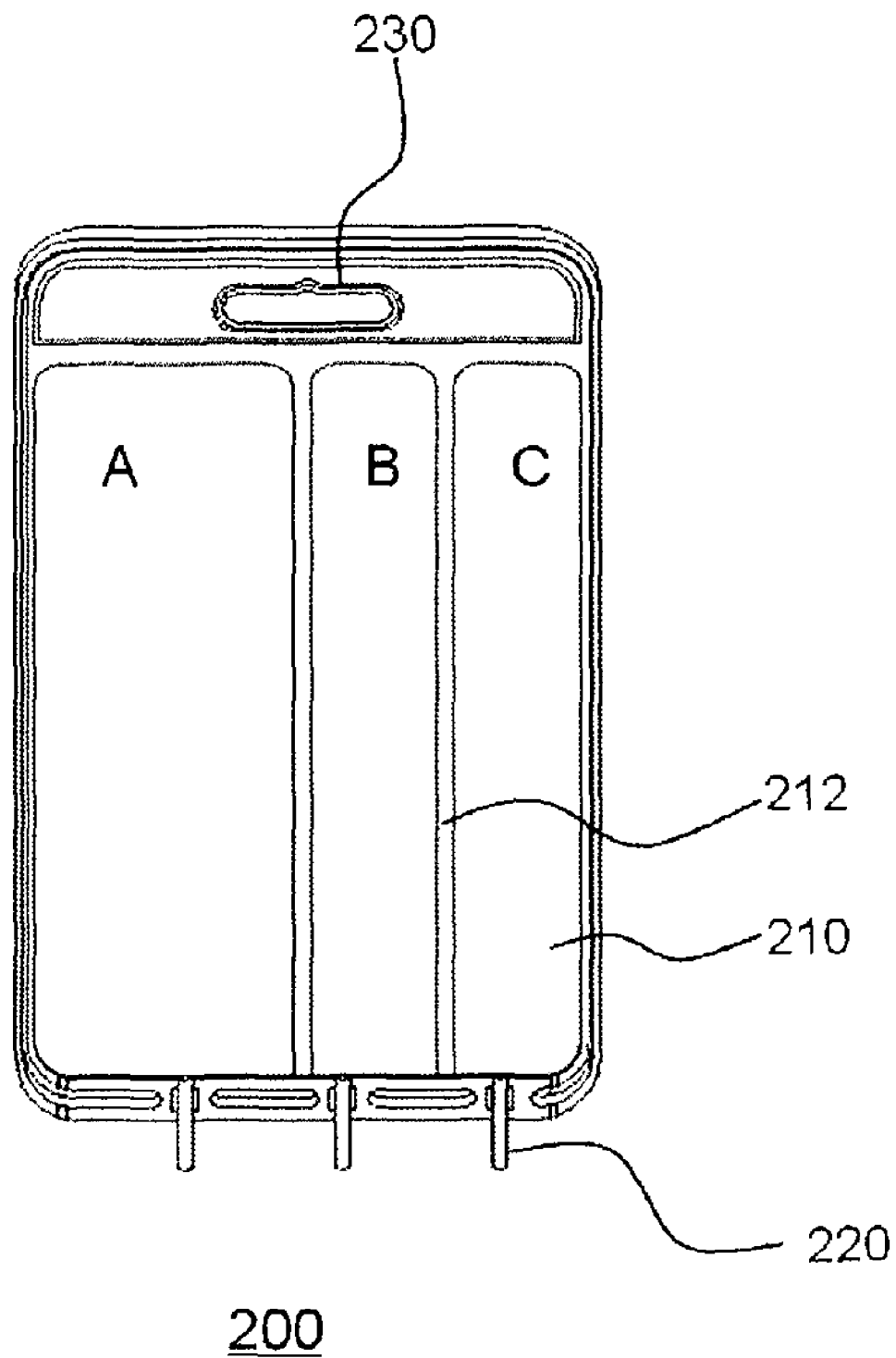
FIG. 4 is a schematic view of the medical solution container in accordance with another embodiment of the present invention.

FIG. 4 is a schematic view of medical solution container (three-chamber bag) in accordance with another embodiment of the present invention.

Referring to FIG. 4, the container (200) comprises inner bag (210) having multi chamber divided by partition wall (212), an outlet for discharging medical solutions (220); and a hanger (230) for hanging the container (200).

The inner bag (210) is divided by partition wall (212) and has chambers for containing medical solutions; i.e. three chambers of A, B, and C. The number of chamber varies adequately depending on needs. The multilayer film of the present invention is applicable to the outer bag of 3 chambers bag.

The container has the outlet (220) for discharging medical solutions in the chambers (A, B, C) with connecting to the inner bag (210).

The partition walls (212) are soft-sealed and have easy peel to open easily by forcing.

By pushing the chambers of A, B, and C in the inner bag (210) of the container (200), the sealing of the partition walls are dismantled, and then opens the chambers of A, B, and C. Notwithstanding the opening of chambers, the inner bag still keeps by out line of the chambers sealed.

After the opening, components of medical solutions in each chamber (A, B, C) fully mix with each other by shaking the inner bag (210). And then, the mixed mixture is administered to a patient via the outlet (220) using a syringe (set for medical solution, not drawn).

MODE FOR INVENTION

Herein below, preferable examples and test examples are disclosed. But the present invention is not restricted within the preferable examples and test examples.

EXAMPLES 1~4 AND COMPARATIVE EXAMPLES 1~3

Multilayer films were prepared by solvent-free lamination based on the composition of Table 1. Using 2-component type of polyurethane (UR7782/6083, product of Henkel) was prepared the adhesive layer having the thickness of 3 μm.

TABLE 1

|  | Exp. 1 | Exp. 2 | Exp. 3 | Exp. 4 | Com. Exp. 1 | Com. Exp. 2 | Com. Exp. 3 |
|---|---|---|---|---|---|---|---|
| outer layer | SiOx-PET (PVD)[1] | SiOx-PET (CVD) | SiOx-PET (PVD) | SiOx-PET (PVD) | SiOx-PET (PVD) | SiOx-PET (PVD) | SiOx-PET (PVD) |
| protective layer[2] | — | — | — | tetraethoxy-silane | — | — | — |
| first intermediate layer[3] | EVOH | EVOH | EVOH | EVOH | — | EVOH | — |
| second intermediate layer[4] | nylon6 | nylon6 | nylon[5] (multi-layer) | nylon6 | nylon6 | — | nylon (multi-layer) |
| inner layer[6] | PP | PP | PP | PP | PP | PP | PP |

[1]SiOx-PET: SiOx 40 nm thickness PVD deposition, Techbarrier, mitsubishi Co., Ltd product, 12 μm
[2]protective layer: 5 μm
[3]EVOH: EVAL Kuraray Co., Ltd product, 15 μm
[4]nylon: Amidroll, Koron Co., Ltd product, 15 μm, corona discharge treatment
[5]multilayer nylon: nylon 6/nylon MXD/nylon 6 (5 μm/5 μm/5 μm)
[6]PP: Sungil chemical Co., Ltd product, 60 μm

TEST EXAMPLE

Estimating properties of multilayer films prepared in examples and comparative examples was shown in Table 2.

(1) Haze after sterilization: using HAZEMETER made in Japan by Toyoseiki Co., Ltd based on ASTM D 1003 after sterilization at 120° C.

(2) Oxygen permeability: using oxygen permeability test instrument based on ASTM D 3985 at 22° C., 0% RH. Measuring twice before and after folding. Estimating on the standard of good: 0~1, normal: 1~5, poor: over 5. measuring the oxygen permeability after folding by twisting square film ten times by the size of 50 cm×50 cm.

(3) Water vapor Transmission Rate (WTR): using water vapor transmission rate test instrument based on ASTM F 1249 at 38° C., 100% RH. Estimating on the standard of good: 0~1, normal: 1~3, poor: over 3.

(4) Pin-hole test: Preparing bag type container by heat seal the multilayer film. Injecting deionized water into the bag. Piling up the bag on cardboard by 2 lines*5 layers. Vibrating test based on JIS Z0200 at vibrating accelerating speed of: ±0.75 G. Counting pin-hole numbers 3 boxes of cardboard (30 packs). Estimating pin-hole numbers on the standard of good: 0, normal: 1~2, poor: over 3.

TABLE 2

| property | | Exp. 1 | Exp. 2 | Exp. 3 | Exp. 4 | Com. Exp. 1 | Com. Exp. 2 | Com. Exp. 3 |
|---|---|---|---|---|---|---|---|---|
| Haze after sterilization, % | | 6.1 | 6.3 | 6.3 | 6.3 | 10.3 | 8.9 | 10.3 |
| oxygen permeability | before folding | normal | good | good | good | normal | normal | normal |
| | after folding | normal | normal | good | good | poor | poor | poor |
| moisture permeability | | normal | normal | normal | good | normal | poor | normal |
| pin-hole | | normal | good | normal | normal | normal | normal | poor |

Referring to Table 2, the tensile strength and elasticity of the examples 1~6 is better than that of the comparative example 1. In addition, it is found that the multilayer film in examples 1~6 has haze after sterilization of 6.3% or less and good transparency.

Referring the result of oxygen permeability, the oxygen permeability of examples 1~6 is lower than the oxygen permeability of comparative example 1. Therefore we may conclude that the oxygen permeability of the examples 1~6 is better than the oxygen permeability of the comparative example 1.

Also referring to pin-hole test result, the pin-hole numbers of the examples is lower than the pin-hole numbers of the comparative example 1.

INDUSTRIAL APPLICABILITY

The multilayer film of the present invention may be applicable to outer bag of the functional medical solution container.

What is claimed is:

1. A high barrier multilayer film for functional medical solution product comprising,
an outer layer comprising polyethyleneterephthalate and an inorganic oxide layer deposited directly on the polyethyleneterephthalate, the inorganic oxide layer being exposed to the atmosphere;
a protective layer disposed directly beneath the polyethyleneterephthalate, the protective layer comprising metal alkoxide of M(OR)n (wherein M is Si, Ti, Al, Zr or Sn, R is an alkyl group of C1 to C6, and n is valence of M), or its hydrolysate form;
a first adhesive layer disposed beneath the protective layer, the first adhesive layer comprising ester type polyurethane;
a first intermediate layer disposed beneath the first adhesive layer, the first intermediate layer comprising ethylene vinyl alcohol copolymer;
a second adhesive layer disposed beneath the intermediate layer, the second adhesive layer comprising ester type polyurethane;
a second intermediate layer disposed beneath the second adhesive layer, the second intermediate layer comprising polyamide;
a third adhesive layer disposed beneath the second intermediate layer comprising ester type polyurethane; and
an inner layer disposed beneath the third adhesive layer, the inner layer comprising propylene-based polymer.

2. The high barrier multilayer film according to claim 1, wherein the inorganic oxide is silicon oxide.

3. The high barrier multilayer film according to claim 1, wherein the inorganic oxide is $SiO_{1.5}$~$SiO_{1.8}$.

4. The high barrier multilayer film according to claim 1, wherein the thickness of the inorganic oxide is 40~200 nm.

5. The high barrier multilayer film according to claim 1, wherein the inorganic oxide is deposited by one method selected from the group consisting of CVD, Low Pressure CVD (LPCVD), Plasma Enhanced CVD (PECVD), Atmospheric Pressure CVD (APCVD), PVD, evaporation deposition, sputtering and Atomic Layer Deposition (ALD).

6. The high barrier multilayer film according to claim 1, wherein the second intermediate layer comprises one material selected from the group consisting of polyamide6, polyamide MXD6, and a mixture thereof.

7. The high barrier multilayer film according to claim 1, wherein the second intermediate layer is a single layer film or multilayer film.

8. The high barrier multilayer film according to claim 7, wherein the multilayer film is laminated polyamide 6/polyamide MXD6/polyamide 6.

9. The high barrier multilayer film according to claim 1, one or both sides of the first and second intermediate layers is further treated by corona discharge.

10. The high barrier multilayer film according to claim 1, wherein the propylene-based polymer comprises one material selected from the group consisting of polypropylene, polypropylene copolymer and a mixture thereof.

11. The high barrier multilayer film according to claim 10, wherein the polypropylene copolymer is copolymerized propylene with a co-monomer selected from the group consisting of ethylene, α-olefin, and a mixture thereof.

12. The high barrier multilayer film according to claim 11, wherein α-olefin is selected from the group consisting of 1-butene, 1-pentene, 1-hexene, 4-methyl-1-pentene, 1-heptene, 1-octene, 1-nonene, 1-decene, 1-undecene, 1-dodecene and a mixture thereof.

13. The high barrier multilayer film according to claim 1, wherein the ester type polyurethane of the first, second and third adhesive layers is two components type adhesive comprising polyurethane and a compound having isocyanate and hydroxyl functional group.

14. The high barrier multilayer film according to claim 1, wherein the multilayer film has the outer layer thickness of 5~20 μm, the first intermediate layer thickness of 10~25 μm, the second intermediate layer thickness of 10~40 μm, the inner layer thickness of 40~120 μm, and the first, second and third adhesive layer the thickness of 1~10 μm.

15. The high barrier multilayer film according to claim 1, wherein the protective layer further comprises a material selected from the group consisting of isocyanate compound, tin chloride and a mixture thereof.

* * * * *